Patented July 21, 1953

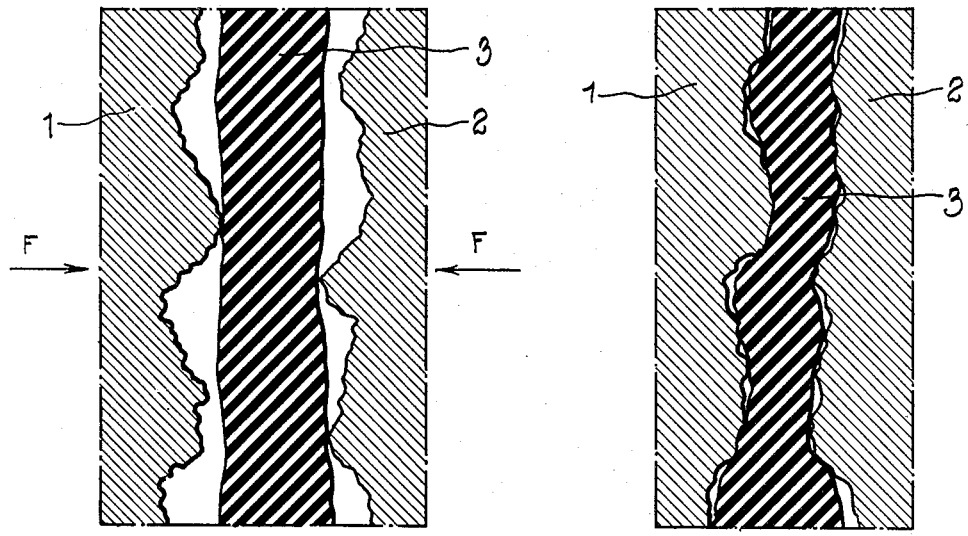
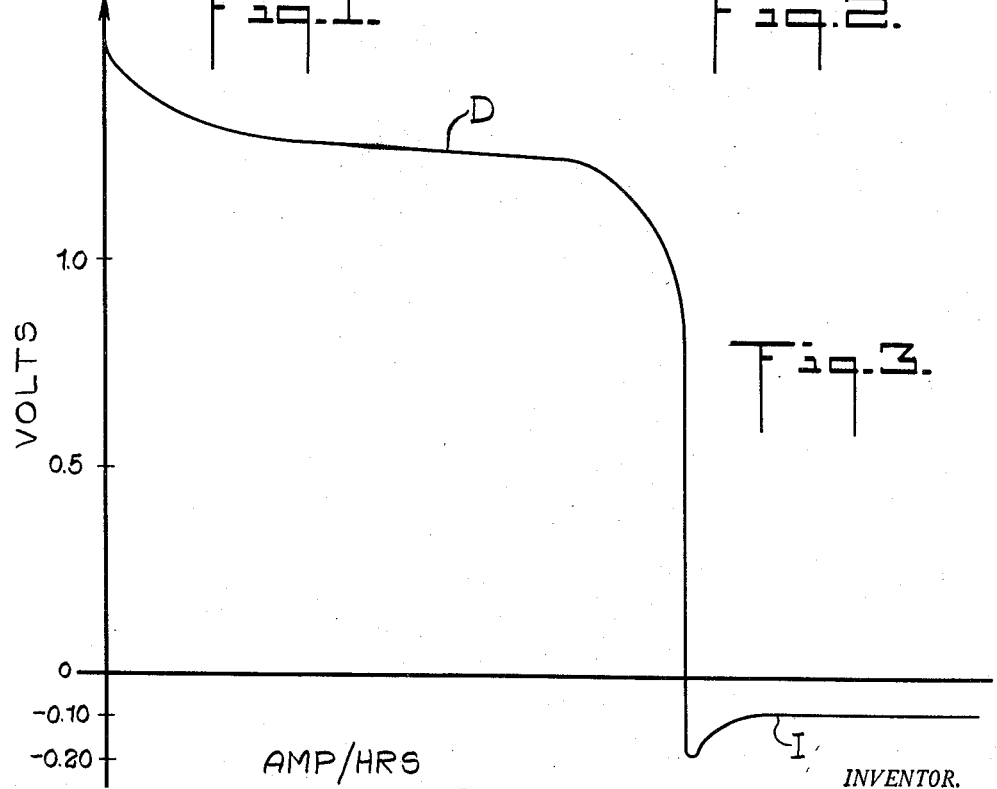

2,646,455

UNITED STATES PATENT OFFICE 2,646,455

ELECTROLYTIC CELL AND BATTERY

Robert A. A. Jeannin, Paris, France, assignor to Societe des Accumulateurs Fixes & de Traction, Romainville, France, a French body corporate Application October 23, 1951, Serial No. 252,645
In France December 9, 1950

16 Claims. (Cl. 136—24)

This invention relates to electrolytic cells or storage batteries capable of being and remaining tightly enclosed or sealed at all times. It has been proposed heretofore to tightly enclose or seal such cells or batteries but such enclosure or sealing has not been practicable because of the evolution and accumulation of gas within the battery casing.

Batteries of the type employing alkaline electrolyte are greatly improved by the embodiment of my invention therein.

The object of this invention is to provide a cell or battery having the usual positive and negative electrodes and an electrolyte, and a method of producing the same, which may remain closed or sealed during passage of current therethrough from an external source, during charging and even overcharging of the electrodes, and during discharging.

I have found that if an electrolytic cell or storage battery is provided with a non-conductive separator between, and closely engaged by, each pair of opposed faces of the electrode plates and the separator is very thin and at least semipermeable, there will not be such evolution and accumulation of gas as will make necessary the venting of the battery or cell casing. I have also found that the achievement of the object of my invention is enhanced, if the face of the separator opposed to the face of the plate is substantially in the configuration of a compression matrix of the face of said plate. I have also found that the achievement of the object of my invention is enhanced by having at least the surfaces of the electrode plates, which are opposed to a separator, micro-porous in construction, for example, as the result of being formed from finely divided consolidated particles. I have also found that a cell or battery accomplishing the object of this invention can be produced by arranging the electrode plates in alternation with very thin compressible and distortable non-conductive separators which are at least semi-permeable and are substantially inert to the electrolyte and then compressing under high pressure the resulting stack of plates and separators to form a unitary or consolidated block, and then saturating the block with electrolyte and placing it in a casing which may be and remain tightly closed or sealed.

Cells or batteries made in accordance with this invention release no visible gas when current is being passed through the cell or battery or during charging or overcharging, or during discharging. The attainment of the absence of visible release of gas is not dependent upon the sealing of the battery container, and it occurs whether the container is sealed or open to the atmosphere; but in the interest of preservation of the purity of the electrolyte and ease of handling of the battery, it is preferable that the battery be definitely closed at the completion of its construction. Sealing is in no way necessary to the functioning of the battery.

Theories have been advanced concerning the absorption by the active material of one plate of gases released at the other plate, but I am not certain as to the exact reasons why there is no visible release of gas in a battery made in accordance with this invention and, therefore, refrain from attempting to state a theoretical explanation for the absence of release of gas.

In the practice of my invention, the pressure employed is as high as 100 kg./cm.$^2$ and the compression may result in a substantial reduction in the volume of the assembly, for example, as much as 30%; and the compression may cause projections on the surface of one eelctrode to project into depressions in the surface of the opposed electrode face. The latter effect may be enhanced by causing one electrode plate to be harder than the other in order that projections on the hard plate may form indentations in the softer plate.

Electrode plates of any thickness may be employed but thinner plates are less brittle than thicker ones, more resistant to breakage during compression, and better suited to obtaining uniform impregnation with active material. Such thin plates afford more surface area in less volume. Such thin plates may have a thickness of the order of 1 millimeter or less.

Further objects and advantages and features of my invention will appear from the following description of a specific construction, the example described being an alkaline battery, which type of battery is greatly improved by the embodiment of my invention therein. In this example of my invention, the micro-porous positive plate is made by sintering, for example at temperatures between 700° to 1000° C., of very fine powder of suitable metal, such as that obtainable by decomposition of nickel-carbonyl, and it is then impregnated with nickel hydrate in known manner. The negative plate may be similarly made from metal powder and impregnated in known manner with negative active material in which cadmium in a suitable form is the major active constituent. Or, the negative plate may be made by compressing, without substantial elevation of temperature, a mixture of finely divided copper particles of interlacing form such as dendritic, arborescent or needle-like crystals, mixed with powdered cadmium or cadmium hydrate or a powdered mixture of cadmium or cadmium hydrate with iron.

Such electrodes are micro-porous and will absorb and retain a high percentage of electrolyte.

In the practice of this invention, the separators are made of materials which are substantially inert to or unattacked by the electrolyte; and in the example above-described the separator may consist of cellulosic material such as closely woven cotton fabric which has preferably previously been mercerized, or the separator may be any porous, semi-porous or micro-porous and compressible and distortable material which is substantially inalterable in use. The separator may be a sheet of cellophane.

The positive and negative plates are arranged in alternation and between all of the opposed faces a separator is positioned. The assembly is then highly compressed and the faces of the separator are, by reason of the compressibility and distortability of the separator, formed into substantially the configuration of a compression-matrix of the opposed face of the electrode, leaving a minimum of unoccupied spaces between the opposed faces of the electrodes. After the compression which will substantially reduce the volume of the assembly, the plates and separator are in a more or less unitary form or a consolidated block. The positive plates are connected together and the negative plates are connected together and the consolidated assembly is saturated with electrolyte. The saturation may be effected by mere soaking or by first creating a high vacuum within the assembly and then immersing it in the electrolyte and releasing the vacuum in order that atmospheric pressure will force the electrolyte into all the interstices of the assembly.

In order to afford a clear understanding of the relation of plates and separators, there is shown in the drawings the opposed electrode plates and the separator before and after compression.

In the drawings:

Figure 1 is a cross-sectional view, highly magnified, of micro-porous surface portions of opposed electrodes, with an uncompressed separator between the faces;

Figure 2 shows the same assembly after compression;

Figure 3 is a discharge diagram of the storage battery described in this example.

In Fig. 1, the highly magnified sectional profiles of plates 1 and 2 are shown as having irregularities due to their formation from materials in the form of powder, and the separator 3 which is about .01 inch thick lies between the electrode faces. After application of pressure in the direction shown by the arrows F, the faces of the separator are formed into substantially the form of a compression-matrix of the opposed faces of the electrode plates leaving a minimum of unoccupied space between those faces. As a result of the compression, projections on one plate are more or less fitted into indentations on the opposed plate, and the projections are at least partly flattened out, with the result that the average distance between the faces of the plates is made more uniform. As above pointed out, this result may be enhanced by having one of the plates softer than the other.

The compressed assembly, above referred to, after saturation with electrolyte is enclosed in a casing which preferably tightly surrounds the assembly and holds the plate-faces in close engagement with the separators and may even exert a continuing compression of the separators.

Preferably, additional electrolyte is added and the casing may or may not then be tightly enclosed or sealed. In the operation of such a battery, or even an electrolytic cell made as above described but omitting the active material from the plates, continuous passage of current through the battery or cell will not produce any visible release of gas, and the battery shows no visible release of gas during charging or overcharging or discharging. This absence of gas release occurs with the use of micro-porous plates and very thin separators lying in close contact between the opposed faces of the electrodes; but I do not attempt a theoretical explanation of the cause of this result.

The absence of gas release has been demonstrated in the following examples:

*Example 1*

Twenty-four plates of sintered nickel powder having each a surface of 13 sq. cm. (about 2 sq. in.) and a thickness of .6 mm. (about .0236") were subjected to a uniform pressure of 100 kg./sq. cm. (about 1,422 p. s. i.), separators of close-woven cotton fabric .15 mm. (about .006") thick being interposed between the plates. The aggregate final thickness of the assembly amounted to 12 mm. (.473"). This assembly was then immersed in a jar containing a potash solution at 24° Bé., every other plate being interconnected and the two series thus obtained being further connected to the terminals of a D. C. source.

When the current flowing across the thus obtained electrolyte cell ranged from zero to 100 milliamperes, no gaseous release was visible. At 100 milliamperes the terminal voltage of the cell was stabilized at 1.35 volts, this being a practically definite level.

On the contrary, a similar cell made according to the practice now conventional in the art, i. e., without compression, at the same current intensity of 100 milliamperes, showed a voltage of 1.56 to 1.58 volts and a visible gaseous release occurred.

*Example 2*

Forty positive and forty negative plates, i. e., eighty plates, similar to those described in Example 1 but impregnated with positive and negative active material, respectively, with interposition therebetween of similar cotton separators, were subjected as above to a pressure of 100 kg./sq. cm. (1,422 p. s. i.) whereby the total thickness is reduced to 40 mm. (1.6"). The capacity of this assembly as determined from the weight of active material impregnated into the plates was then found to be 6 ampere-hours. The thus obtained block of pressed plates was then immersed in an open-top jar containing a potash solution at 24° Bé. This battery was then charged at a charging rate of 1.5 amperes, i. e. definitely higher than the normal charging rate which, as known, is equal to one-fifth of the ampere-hours capacity, in amperes, which in the present instance means 1.2 amperes. After a 15-hour charge, corresponding to a charge of 22.5 ampere-hours and therefore to a considerable overcharge of the battery, the terminal voltage was only 1.46 volts. Moreover, it was observed that this final voltage at completion of charge was maintained without gaseous release during an overcharge lasting several days at a .6-ampere rate. By way of comparison, a storage battery made of the same elements but without subjecting the latter to the pressure defined above, shows a 1.60 to 1.75-volt potential range with a strong gaseous release after a maximum charging time of 8 hours at the same rating of 1.5 amperes.

A number of subsequent experiments made with the compressed-cell battery showed that the terminal voltage was never above 1.48 volts. In each test an open jar was used.

*Example 3*

After having fully charged and even overcharged the battery described in Example 2, the same battery was discharged with a two-ampere load, corresponding to one-third of the ampere-hour capacity of the battery. The average voltage at the terminals of the battery was about 1.25 volts. In relation to time, this voltage decreased rather slowly at first, as illustrated by the curve D, Fig. 3, and then dropped very sharply to zero, practically, when the battery was discharged. At this moment, the same current strength was kept circulating in the same direction across the battery from an auxiliary source, whereby the battery was put in the condition of inverted charge. Terminal voltage measurements are plotted in curve I forming the extension of curve D, Fig. 3. As illustrated by this curve, the reversed voltage of the battery began to rise in absolute value and then dropped very quickly until it was stabilized at about −0.10 volt, without any visible gaseous release.

This phenomenon of extremely low voltage of the inverted charge is very important because it makes it possible to connect in series battery cells made in accordance with this invention without the danger that inversion of one battery cell will cause any substantial decrease in the output voltage of the series. When battery cells are connected in series, inversion of one of the cells is not unusual because the capacities of the batteries are not all alike and the first battery discharged will become reversed. In batteries of conventional construction, the reversal shows a reversed voltage of −1.50 to −1.70 volts and a substantial release of gas occurs. In comparison, when using batteries made according to this invention, the reverse voltage remains low and there is no substantial release of gas.

Since there is no release of gas in batteries made in accordance with this invention, the charging current efficiency, being the ratio of the amount of current chemically transforming active material to the total impressed current, is the same on both plates at all times. While there is theoretically no advantage in using electrodes having different capacities, the advantage of the low reversing current in the batteries of this invention can be retained by making one electrode, preferably the negative electrode, with a higher capacity than the other and giving it an initial charge not substantially in excess of the difference in capacity, thus preventing the simultaneous reversal of both electrodes. This can be accomplished by incorporating in one electrode an electro-chemically greater amount of active material than is incorporated in the other. The electrode of higher capacity is then given a charge exceeding that of the electrode of lower capacity by an amount not in excess of such difference of capacity, before the electrodes are assembled in the battery.

In batteries made according to this invention, the amount of electrolyte present in the cell may be limited substantially to that which is retained by capillarity in the pores of the block or assembly constituted by the compressed plates and separators, but as a precaution, a little additional electrolyte may be present. When completed by compression, the block or assembly consists of plates of opposed polarity having their faces separated substantially only by separators and the distance between those faces may be of the order of one-tenth of a millimeter (.004″) up to a few tenths of a millimeter (.02″). References herein to thin separators are intended as a reference to a separator which after the compression step will cause the faces of the plates, which closely engage the separator, to be spaced a distance within the range last mentioned. The separators are substantially in register with and at least coextensive with the opposed plate faces.

From the foregoing, it will be apparent that while some of the features of my invention have independent value, the best results are obtainable when the plates or electrodes are micro-porous, close contact between the opposed faces of electrodes and the separator is established as by compression and maintained, and the separator is thin.

From the foregoing, it will be apparent that the absence of release of gas makes possible the tight closing of the battery casing or jar. It has been observed that when the batteries of Examples 2 and 3 are tightly sealed, the charging voltage remains practically the same as the charging voltage observed in the tests in an open-top jar.

The specific details contained in the foregoing description of examples of my invention are mentioned for the purpose of facilitating an understanding of my invention and not as limiting it, and the references therein to alkaline electrolyte and to cadmium or cadmium and iron are not intended to limit my invention thereto because my invention is applicable to electrode plates or blocks carrying any active materials and cooperating with any electrolytes known in the art of batteries. My invention includes such variations and modifications as fall within the following claims.

What I claim is:

1. An electrolytic cell in which in normal operation the voltage at the terminals never exceeds 1.48 volts and which is, consequently, without substantial gas evolution, comprising an electrolyte, at least one positive electrode and one negative electrode located opposite one another, each electrode comprising consolidated finely-divided particles of a metal substantially unaffected by the electrolyte, a thin, distortable diaphragm of non-conducting matter unaffected by the electrolyte and having a surface at least equal to that of the adjacent faces of the opposite electrodes, said diaphragm being closely engaged between the adjacent faces of the electrodes at least by previously exerted strong pressure against the assembly of electrodes and diaphragm, whereby each face of the diaphragm is substantially in the configuration of a compression-matrix of the face of the adjacent electrode, and said electrodes and said diaphragm being saturated with said electrolyte.

2. A secondary cell in which in normal operation the voltage at the terminals never exceeds 1.48 volts and which is, consequently, without substantial gas evolution, comprising an electrolyte, at least one positive electrode and one negative electrode located opposite one another, each electrode including consolidated finely-divided particles of metal substantially unaffected by the electrolyte, the pores of which respectively contain positive and negative active materials, a thin, distortable diaphragm of non-conducting matter substantially unaffected by the electrolyte and having a surface at least equal to that of adjacent faces of the opposite electrodes, said diaphragm being closely engaged between the adjacent faces of the electrodes at least by previously exerted pressure against the assembly of electrodes and diaphragm, whereby each face of the diaphragm is substantially in the form of a compression-matrix of the face of the adjacent electrode, and said electrodes and diaphragm being saturated with said electrolyte.

3. A secondary cell according to claim 2, wherein the diaphragm has, before compression, a thickness of at the most five-tenths of a millimeter.

4. A secondary cell according to claim 2, wherein the electrodes are in the form of plates, the thickness of which is at the most one millimeter.

5. A secondary cell according to claim 2, wherein at least each positive electrode is of sintered electrode type.

6. A secondary cell according to claim 2, wherein electrodes of at least one polarity are formed of metal particles of interlacing form consolidated by previous compression and each carries active materials in its pores.

7. A secondary cell according to claim 2, wherein the electrodes, diaphragm and electrolyte are enclosed in a gas and liquid-tight casing.

8. A secondary cell according to claim 2, wherein the electrolyte is alkaline and consists of alkali metal hydroxide solution.

9. A secondary cell according to claim 2, wherein the electrolyte is alkali metal hydroxide solution, wherein the positive active material includes nickel hydroxide and the negative active material includes cadmium in convenient chemical form as its main constituent.

10. A secondary cell according to claim 2, wherein the diaphragm is a non-conductive closely-woven fabric substantially unaffected by the electrolyte.

11. A secondary cell according to claim 2, wherein a casing is included that is in close mechanical contact relationship with the assembly of said electrodes and said diaphragms, whereby said electrodes and diaphragms are kept pressed against each other.

12. An electrolytic cell according to claim 1, wherein said electrodes each consist solely of sintered nickel powder and wherein said electrolyte is alkali metal hydroxide solution.

13. The method of constructing a secondary cell which comprises the steps of arranging alternately positive and negative electrodes composed of consolidated finely-divided particles of metal substantially unaffected by the electrolyte and carrying suitable active materials in their pores, placing between faces of said electrodes, thin, compressible, distortable, non-conducting diaphragms substantially unaffected by the electrolyte, compressing together the assembled electrodes and diaphragms with a pressure of the order of at least 100 kg./cm.$^2$ so as to reduce the initial volume of the assembly up to 30% in the direction perpendicular to said faces, inserting the assembly in a casing which closely engages the compressed assembly and holds the electrodes and diaphragms in close engagement, saturating the compressed assembly with a suitable electrolyte and sealing the casing.

14. A cell operating without substantial gas evolution, comprising an electrolyte, at least one positive electrode and one negative electrode located opposite one another, each electrode comprising consolidated finely-divided particles of a metal substantially unaffected by the electrolyte, a thin, distortable diaphragm of non-conducting matter substantially unaffected by the electrolyte and contacting and separating the adjacent faces of the opposite electrodes, said diaphragm being closely compressed between the adjacent faces of the electrodes, and each face of the diaphragm being substantially in the configuration of a compression-matrix of the face of the adjacent electrode, said electrodes and said diaphragms being permeated by said electrolyte.

15. A secondary cell operating without substantial gas evolution, comprising an electrolyte, at least one positive electrode and one negative electrode located opposite one another, each electrode including consolidated finely-divided particles of metal substantially unaffected by the electrolyte, the pores of which electrodes respectively contain positive and negative active materials, a thin, distortable diaphragm of non-conducting matter substantially unaffected by the electrolyte and contacting and separating the adjacent faces of the opposite electrodes, said diaphragm being closely compressed between the adjacent faces of the electrodes, and each face of the diaphragm being substantially in the configuration of a compression-matrix of the face of the adjacent electrode, and said electrodes and said diaphragm being permeated by said electrolyte.

16. The method of constructing a secondary cell which comprises the steps of arranging alternately positive and negative electrodes composed of consolidated finely-divided particles of metal substantially unaffected by the electrolyte and carrying suitable active materials in their pores, placing between faces of said electrodes, thin, compressible, distortable, non-conducting diaphragms substantially unaffected by the electrolyte, compressing together the assembled electrodes and diaphragms to form each face of the diaphragm into the configuration of a compression-matrix of the adjacent electrode, inserting the assembly in a casing which closely engages the compressed assembly and holds the electrodes in close engagement, permeating the compressed assembly with a suitable electrolyte and sealing the casing.

ROBERT A. A. JEANNIN.

References Cited in the file of this patent

UNITED STATES PATENTS

| Number | Name | Date |
|---|---|---|
| 1,377,194 | Edison | May 10, 1921 |
| 2,213,128 | Langguth | Aug. 27, 1940 |
| 2,554,125 | Salauze | May 22, 1951 |
| 2,561,943 | Moulton et al. | July 24, 1951 |
| 2,571,927 | Neumann et al. | Oct. 16, 1951 |
| 2,594,713 | Andre | Apr. 20, 1952 |

FOREIGN PATENTS

| Number | Country | Date |
|---|---|---|
| 270,655 | Switzerland | Sept. 15, 1950 |
| 561,820 | Great Britain | June 6, 1944 |